US008109388B2

(12) United States Patent (10) Patent No.: US 8,109,388 B2
Rosendall et al. (45) Date of Patent: Feb. 7, 2012

(54) SECURITY PACKAGING

(75) Inventors: Eric A. Rosendall, Grand Ledge, MI (US); Kenneth Glinert, Chappaqua, NY (US)

(73) Assignee: Multi Packaging Solutions, Inc., Lansing, MI (US)

( * ) Notice: Subject to any disclaimer, the term of this patent is extended or adjusted under 35 U.S.C. 154(b) by 167 days.

(21) Appl. No.: 12/726,521

(22) Filed: Mar. 18, 2010

(65) Prior Publication Data

US 2011/0031148 A1 Feb. 10, 2011

Related U.S. Application Data

(60) Provisional application No. 61/232,124, filed on Aug. 7, 2009.

(51) Int. Cl.
*B65D 85/00* (2006.01)
*B65D 85/48* (2006.01)

(52) U.S. Cl. ............... 206/459.1; 206/449; 206/461; 206/807; 493/210

(58) Field of Classification Search ............... 206/459.1, 206/449, 451, 454, 461, 555, 806, 807; 53/460, 53/473; 235/380, 382, 382.5, 486, 487; 493/186, 493/210, 222
See application file for complete search history.

(56) References Cited

U.S. PATENT DOCUMENTS

| 4,359,633 | A | 11/1982 | Bianco |
| 4,887,763 | A | 12/1989 | Sano |
| 4,972,953 | A * | 11/1990 | Friedman et al. .......... 206/459.1 |
| 4,998,666 | A * | 3/1991 | Ewan .................... 206/459.1 |
| 5,142,384 | A * | 8/1992 | Wood et al. ............... 206/459.1 |
| 5,667,247 | A | 9/1997 | Ramsburg et al. |
| 5,727,686 | A * | 3/1998 | Kristal .................. 206/459.1 |
| 5,760,381 | A | 6/1998 | Stich et al. |
| 5,777,305 | A | 7/1998 | Smith et al. |
| 5,842,629 | A | 12/1998 | Sprague et al. |
| 5,868,498 | A | 2/1999 | Martin |
| 5,975,302 | A | 11/1999 | Young |
| 6,096,387 | A | 8/2000 | Decker |
| 6,109,439 | A | 8/2000 | Goade |
| 6,269,158 | B1 | 7/2001 | Kim |
| 6,349,829 | B1 | 2/2002 | Matheis et al. |
| 6,493,970 | B1 | 12/2002 | McCarthy et al. |
| 6,619,480 | B2 | 9/2003 | Smith |

(Continued)

FOREIGN PATENT DOCUMENTS

CA 2627782 A1 9/2008

(Continued)

OTHER PUBLICATIONS

Copending International Application No. PCT/US2010/027770, filed on Mar. 18, 2010, published with International Search Report as WO2011/016877A1 on Feb. 10, 2011.

(Continued)

*Primary Examiner* — Luan K Bui
(74) *Attorney, Agent, or Firm* — Dobrusin & Thennisch PC

(57) ABSTRACT

A security packaging provides multi-layer laminate structure for providing evidence of package tampering. The packaging may include a first panel having an opening therein in planar contact with an insert member and a film layer. The film layer may include a pattern layer that may be adhered to the film layer via an adhesion layer. A second adhesion layer may be placed onto the pattern layer to adhere the pattern layer to the insert member.

20 Claims, 4 Drawing Sheets

U.S. PATENT DOCUMENTS

| | | | |
|---|---|---|---|
| 6,640,974 B2 * | 11/2003 | Malone | 206/449 |
| 6,715,795 B2 | 4/2004 | Klure | |
| 6,877,263 B2 | 4/2005 | Clark | |
| 7,000,844 B1 | 2/2006 | Smith | |
| 7,275,683 B2 | 10/2007 | Lazarowicz et al. | |
| 2002/0100797 A1 | 8/2002 | Hollingsworth et al. | |
| 2003/0028439 A1 | 2/2003 | Cox et al. | |
| 2003/0133630 A1 | 7/2003 | Wang | |
| 2003/0150762 A1 * | 8/2003 | Biller | 206/461 |
| 2004/0146688 A1 | 7/2004 | Treat | |
| 2004/0245134 A1 | 12/2004 | Alcouloumre et al. | |
| 2005/0204600 A1 | 9/2005 | Lauer et al. | |
| 2005/0273153 A1 | 12/2005 | Ashby et al. | |
| 2005/0279825 A1 | 12/2005 | Ashby et al. | |
| 2009/0107862 A1 | 4/2009 | Pascua et al. | |
| 2011/0031148 A1 | 2/2011 | Rosendall et al. | |

FOREIGN PATENT DOCUMENTS

| | | |
|---|---|---|
| EP | 1296306 A2 | 3/2003 |
| WO | 2011/016877 A1 | 2/2011 |

OTHER PUBLICATIONS

Copending U.S. Appl. No. 12/054,583, filed Mar. 25, 2008, published as US-2008-0237317-A1 on Oct. 2, 2008 (now abandoned).

Office Action mailed Mar. 5, 2009 in copending U.S. Appl. No. 12/054,583, filed Mar. 25, 2008, published as US-2008-0237317-A1 on Oct. 2, 2008 (now abandoned).

Copending Canadian Application No. 2,627,782-A1, filed Mar. 25, 2008.

Copending U.S. Appl. No. 13/132,363, filed Jun. 2, 2011.

* cited by examiner

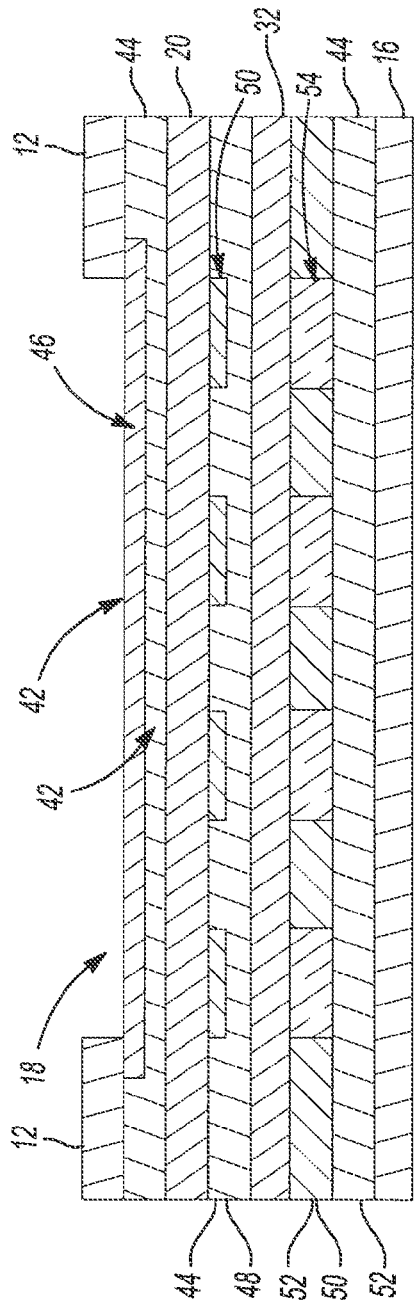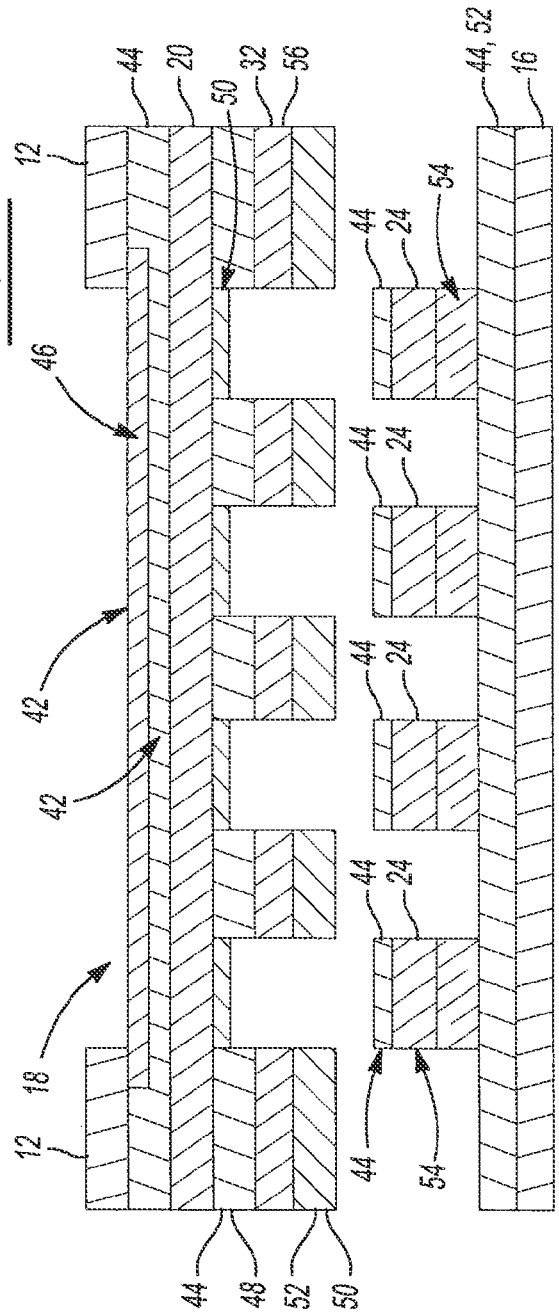

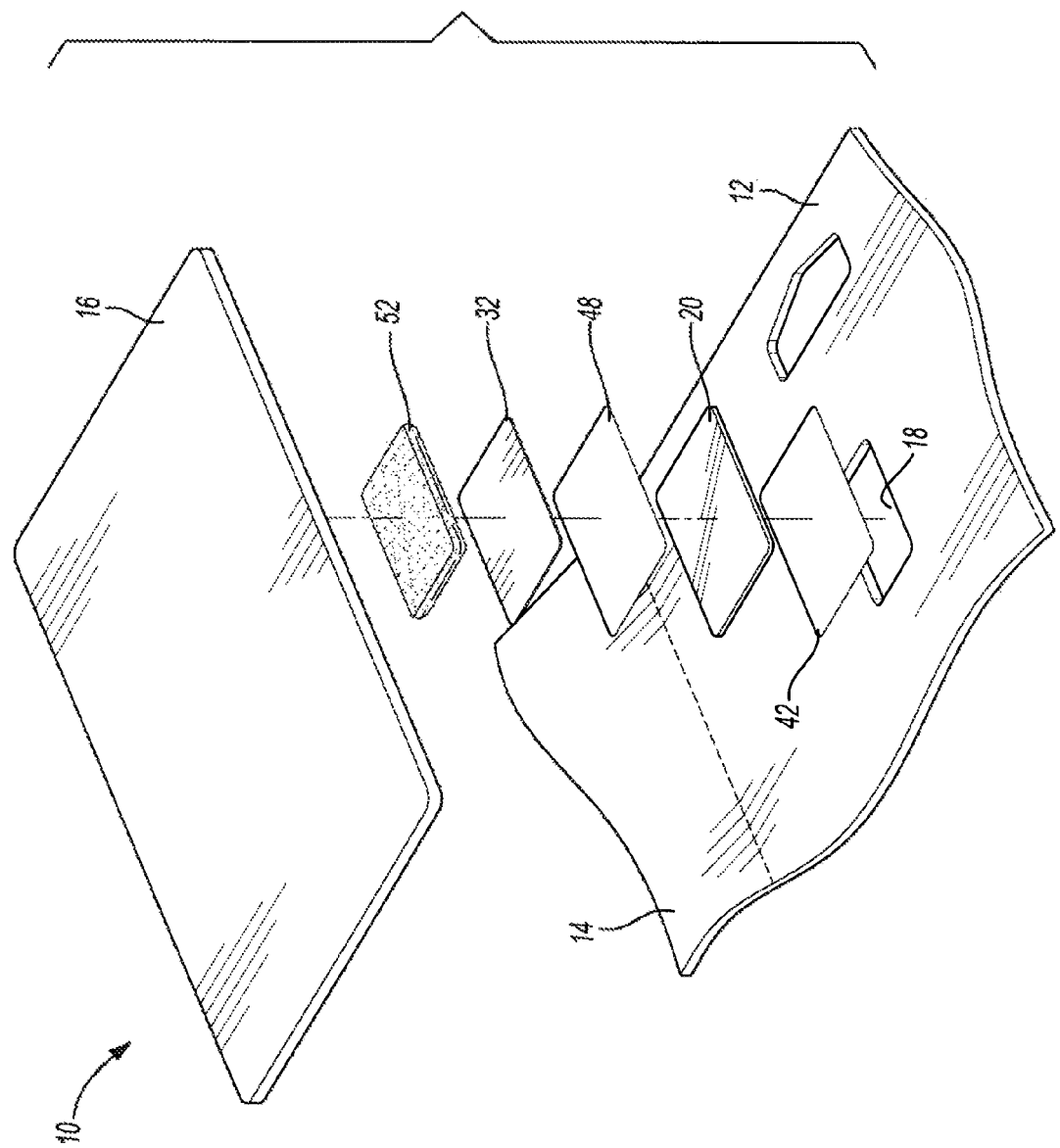

SECURITY PACKAGING

CLAIM OF PRIORITY

This application claims the benefit of the filing date of U.S. Provisional Application Ser. No. 61/232,124 filed on Aug. 7, 2009, the entirety of the contents of this application being hereby expressly incorporated by reference.

FIELD OF THE INVENTION

The present invention relates generally to tamper evident security packaging, and more specifically to a security packaging which provides a visual indication if package tampering has occurred.

BACKGROUND OF THE INVENTION

In the retail sector and elsewhere, as retail fraud and other criminal acts continue to be practiced, there has been an ongoing and growing need for improved tamper evident packaging. Foods, consumer products, medications, mail and other goods continue to be the object of tampering, whether to taint contents, alter freshness assurances, to gain valuable private and/or confidential information, or for some other purpose. In particular, product packaging is often damaged or compromised. One type of packaging that is particularly susceptible to tampering is that associated with pre-paid gift cards. As an example, it is a common practice in the pre-paid card sector to encode or otherwise load a card (e.g., a generally rectangular plastic "wallet-sized" card, akin to a credit card) with a predetermined cash equivalent value. Upon payment by a consumer for the value on the card, the card can then be used to pay for transactions until the value on the card has been depleted. The cards may not necessarily be registered in the identity of a particular individual, and thus resemble cash, in the sense that it is difficult to trace transactions and correlate them with particular users of the cards. The relative anonymity of the resulting transactions thus makes pre-paid cards attractive theft targets.

Security features are often employed in the packaging industry in an effort to deter theft and protect legitimate consumers. Unfortunately, many existing security features have been circumvented by individuals involved in retail theft. While many tamper-evident and theft-proof features have been developed, most are cost prohibitive given the low cost requirement for packaging, as the packaging must be provided to a consumer for essentially no cost as an enticement to seek goods or services from a particular retailer or service provider. In regard to pre-paid card packaging, assuming that a consumer is going to purchase a card with a value of $25, the consumer will only expect to pay $25 for the card, with no additional charges. As a result, it has proven particularly challenging to develop security features that effectively prevent and deter theft at a very low cost point.

A common theft issue with particular relevance to the pre-paid card industry includes the ability to remove a pre-paid card from a retail outlet without activating or purchasing the card. The account information can then be accessed and recorded and the card repackaged either in its original packaging or new packaging which can then be placed back onto a retail outlet shelf. Once the card is activated by a legitimate paying customer, the account information can be used to make purchases without the knowledge of the paying customer. For example, a wrongdoer may have taken a pre-paid card from a retail location, removed the card from its packaging, obtained the code associated with the card, and then carefully re-packaged the card so it appears unused, as if new. The wrongdoer will then enter into a transaction (e.g., on the internet, via mail order, or otherwise) in which the wrongdoer supplies the card code as means of payment. If and when the card is activated by the legitimate user, the transaction of the wrongdoer will be processed. The sophistication of the techniques of the wrongdoers has become so refined in recent years that re-packaging of cards into their original packaging commonly results in little or no evidence to a reasonably observant cashier that the card has been removed from the packing and subsequently repackaged.

U.S. Pat. No. 5,777,305 discloses a packaging assembly that permits remote activation and deactivation of a pre-paid card without removing the card from the packaging. However, the teachings do not appear to address the difficulties in preventing an individual from stealing an unactivated card, removing the unactivated card from the packaging to record any necessary account numbers or codes from the card and placing the unactivated card back into the packaging and subsequently back on a store shelf.

U.S. Pat. No. 5,667,247 discloses a card package assembly that includes an adhesive placed on an inner wall of the packaging to hold a card in place. However, the packaging does not appear to afford a simple and straightforward approach to determining whether tampering has occurred.

U.S. Pat. No. 7,000,844 discloses a display packaging for gift cards that includes a personal identification number or "PIN" obscured by a removable covering. However, one of the problems sought to be addressed by the present teachings does not appear to be solved by teachings of that patent, inasmuch as the disclosure of the patent makes it possible to re-cover the PIN to create the appearance that no tampering has occurred.

U.S. Patent Application Publication No. 2009/0107862 discloses a card and carrier system that shows damage to the carrier when the enclosed card is accessed. However, the card itself shows no indication of tampering and there is no means disclosed to prevent the carrier from being repaired with no indication of tampering.

Notwithstanding the above, there remains a need for improved packaging that indicates tampering on a carrier so that the carrier cannot be repaired or reproduced with no tamper indication. There is a further need for packaging that includes unique patterns and associated substrates so that the packaging cannot be easily recreated. More particularly, there continues to be a need for low-cost tamper-evident packaging that does not allow individuals to re-package a pre-paid card after accessing and recording the necessary account information from the pre-paid card.

SUMMARY OF THE INVENTION

The present invention addresses one or more of the above needs by providing improved tamper evident packaging and associated methods, in which a package encloses an object in a manner in which the object cannot be removed without substantially irreversibly disrupting an indicator of tampering. For example, the packaging may be a generally elongated and flattened package that includes a generally flat visual indicator that may reside within the package and be covered by an at least partially transparent window of the package. The visual indicator may be the result of a layered structure that includes a pattern layer adheringly deposited between the window and an opposing layer. The adhesion characteristics of the pattern layer are such that upon opening of the package, a first portion of the pattern layer remains adhered to the opposing layer and a second portion of the pattern layer remains adhered to the window. Either or both of the first or second portion, or possibly even a third portion will be substantially irreversibly disrupted. For example, it may dislodge from the pattern layer; it may detectably alter one or more of a magnetic, electrical, optical, radio frequency and/or other detectable characteristic of the pattern layer; it may bond to neither the window nor the opposing layer; it may plastically deform, or any combination of the foregoing.

In one aspect, there is contemplated a packaging that includes a layered structure having a first panel, a film, a pattern layer, one or more adhesive and/or release coat layers, and an insert member. The first panel may have an opening therein. The film may have first and second surfaces and may be at least partially transparent. The film may further overlay the opening in the first panel so that the first surface of the film opposes the first panel. An adhesion layer (e.g., a layer including one or more adhesives, release coatings, adhesive deadeners or protective films) may be located at one or more locations between the first panel and the film layer. The pattern layer may be formed on the second surface of the film. An additional adhesion layer (e.g., a layer including one or more adhesives, release coatings, adhesive deadeners or protective films) may be located between the film layer and the pattern layer. The pattern layer may be placed in contact with the insert member. Another adhesion layer may be placed at one or more locations between the pattern layer and the insert member. The adhesion layers may have a peel strength relative to the pattern layer that is higher than the peel strength relative to an adjacent surface so that upon separation of the insert member from the first panel the first and second adhesion layers each remove a portion of the pattern layer from the film or insert member thereby leaving an indicator visible through the opening and film that such separation has occurred.

Among the various features of the teachings herein are that the layered structure may include at least two panels folded and bonded to retain the insert member therein. An opening (e.g., a cut-out window) in one panel may be covered by a film to which the insert member is removably adhered to by at least a portion of an adhesion layer. The surface of the film facing the insert member may include a removable pattern layer which may include a material layer and/or other indicia which adheres to a portion of an adhesion layer. When the insert member is removed, a portion of the adhesion layer may remove a portion of the pattern layer from the film to reveal evidence of the removal through the cut-out window. This indicates that removal or tampering with the insert member has occurred.

Advantageously, the packaging may be formed as a layered structure having one or more panel layers, an insert member layer, a film layer and one or more adhesion layers. Among the various features that the film layer may exhibit that can contribute to its advantages are that a pattern layer may be included (e.g., printed or embossed) in contact with the film layer. An adhesion layer may be located between the pattern layer and the film layer. The pattern layer may be formed of an additional layer of material (e.g., a foil) placed onto the film layer. An adhesion layer may be used to adhere at least a portion of the pattern (e.g., foil) layer to the film layer. The pattern layer may be of such an intricate nature that once the pattern layer is disrupted, it will be difficult if not impossible to re-construct the pattern layer. An adhesion layer may be placed between the film layer and the insert member. An additional adhesion layer may be placed between the film layer and the pattern layer (e.g., foil layer). When any attempt is made to separate the film layer and the insert member, the pattern layer may be disrupted, e.g., to a substantially irreversible state. For example, the pattern layer may be fractured; it may detectably alter one or more of a magnetic, electrical, optical, radio frequency and/or other detectable characteristic of the pattern layer; it may plastically deform, or any combination of the foregoing. As one specific example, during disruption, the pattern layer may be torn apart and/or the pattern layer may break into miniscule particles, thus making reconstruction of the pattern layer to its original form difficult.

Also contemplated within the scope of the teachings herein is the addition of a coating, treatment, or mechanism to one or more adhesion layers that will cause cohesive failure between one or more of the layers. The pattern layer may also include a continuous configuration such that the continuous configuration is disrupted during separation of the film layer and the insert member. The pattern layer may be placed onto the film layer or may be located within the film layer.

BRIEF DESCRIPTION OF THE DRAWINGS

FIG. 1 is a cross-sectional view depicting the multiple substrate layers of an illustrative packaging in accordance with the present teachings.

FIG. 2 is a cross-sectional view depicting the multiple substrate layers after separation of one or more layers of an illustrative packaging in accordance with the present teachings.

FIG. 6 is a perspective view of an illustrative packaging in accordance with the present teachings

DETAILED DESCRIPTION

Figure 3:
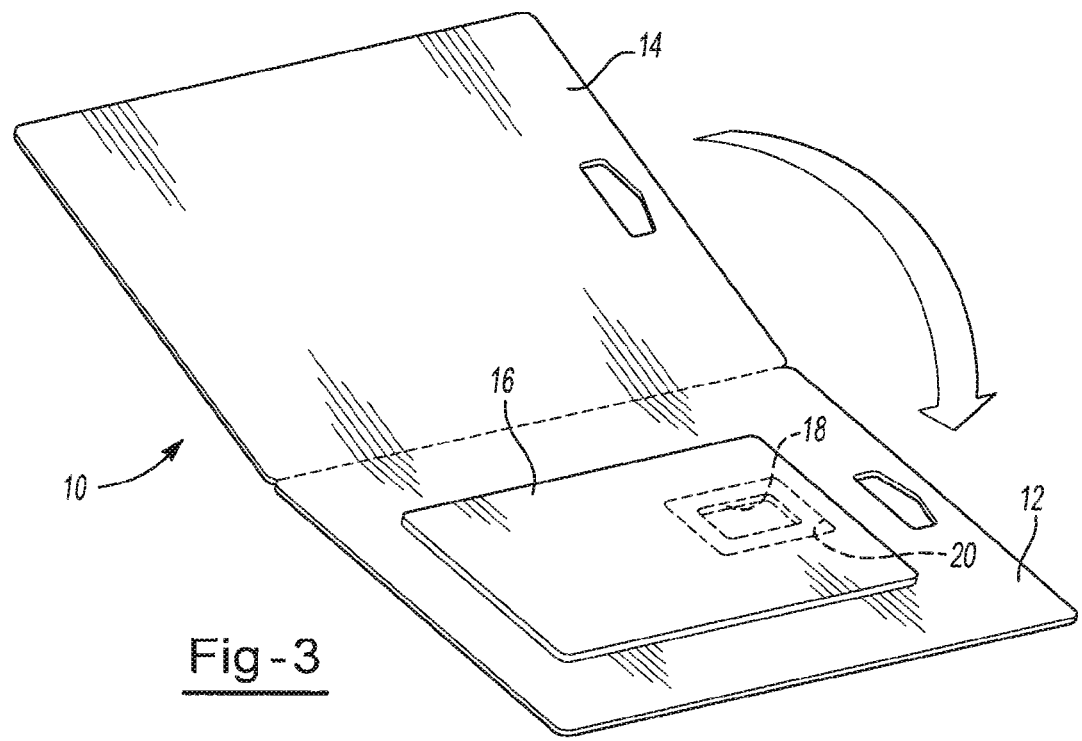
FIG. 3 is a perspective view of an illustrative packaging in accordance with the present teachings.

In general, the teachings herein provide for a packaging that includes at least one panel, a film layer, a pattern layer, one or more adhesion layers, and an insert member. One or more of the at least one panel may include an opening therein. The film layer may have first and second surfaces and may be at least partially transparent and overlaying the opening in the at least one panel so that the first surface of the film layer opposes the first panel. The pattern layer may be formed on the second surface of the film. An adhesion layer may be at least partially overlying the film layer and the opening. The insert member may be placed in planar contact with an adhesion layer. The adhesion layers may have a peel strength relative to one or more adjacent layers that is higher than the peel strength to the pattern layer so that upon separation of the insert member from the at least one panel one or more adhesion layers removes at least a portion of the pattern layer from the film layer thereby leaving an indicator visible through the opening and film layer that such separation has occurred.

The present invention further provides for a packaging that includes a material layer (e.g., a pattern layer) placed between two substrates that separates, disintegrates or is damaged in some way during any effort to separate the two substrates. The composition of the material layer may be such that the material layer itself breaks down or fragments during separation of the two substrates. The composition of the material layer may be such that the material layer tears during separation of the two substrates. The material layer may also include a pattern within having sufficient complexity that once the pattern is damaged, it is impossible to accurately recreate the pattern without an indication that the pattern has been modified. The damage is preferably sufficient so that any separated material layer cannot be re-constituted or any pattern cannot be reformed.

When any attempt is made to separate the film layer and the insert member, the pattern layer may be disrupted, e.g., to a substantially irreversible state. For example, the pattern layer may be fractured. The pattern layer may detectably alter one or more of a magnetic, electrical, optical, radio frequency and/or other detectable characteristic of the pattern layer. The pattern layer may plastically deform. The pattern may be torn apart and/or the pattern may break into miniscule particles. The pattern layer may be designed so that any combination of the foregoing disruptive alterations may occur, thus increasing the difficulty of reconstruction.

The film layer itself may be composed of a material capable of disintegration or fragmentation as discussed above. The film layer may be covered and/or coated with a material capable of disintegration or fragmentation (e.g., a pattern layer). The film layer may include a pattern layer within the film layer (e.g., embossed or imprinted). The film layer may also include a pattern printed onto the film layer. The film layer may be contacted with an additional material layer or coating that includes the pattern either within the additional material layer or coating or printed onto the additional material layer or coating. The film layer may include an additional layer or coating so that at least a portion of the additional material layer or coating is removed from the film layer during separation of the film layer and the insert member.

The packaging disclosed herein may also include one or more adhesion layers. The adhesion layers may include a material that causes adherence of at least a portion of one layer (including any coating layer or additional material layer) to another layer. An adhesion layer may adhere at least a portion of the film layer to at least a portion of the pattern layer. An adhesion layer may adhere at least a portion of the pattern layer to at least a portion of the insert member. An adhesion layer may adhere at least a portion of the film layer to at least a portion of one or more panels. The adhesion layers may also include a material that causes cohesive failure between at least a portion of the film layer (and/or any coating layer or additional material layer) and another layer. The adhesion layer may also include a film to prevent at least a portion of one layer from adhering to at least a portion of another layer. The adhesion layers may include both of an adhesive portion and release coating (e.g., cohesive failure) portion. The adhesion layers may include only an adhesive portion or only a cohesive failure portion.

The packaging may be assembled by providing a first planar panel having an opening. A first adhesion layer may then be placed in contact with the first panel. The adhesion layer may include a film or adhesive deadener so that only the portion of the first panel that is adjacent to the opening (as opposed to the opening itself) is contacted by a material that causes adherence. A film layer may then be placed in contact with the first adhesion layer so that the film layer covers the opening and adheres to the portion of the first panel adjacent the opening. A second adhesion layer may then be deposited onto the film layer (e.g., on the surface of the film layer opposite the surface that contacts the first adhesion layer). As discussed herein, a pattern layer (e.g., a coating layer or additional material layer) may then be placed onto the second adhesion layer. The film layer or any coating or additional material layer may be embossed or treated in some way to form the pattern layer. The pattern layer may include a pattern at the time of assembly. The pattern layer, including any coating or additional material layer, may then be contacted by a third adhesion layer. As with any adhesion layers discussed herein, the third adhesion layer may include portions of material that cause adhesion and portions of material that cause cohesive failure (e.g., release coatings, adhesive deadeners, films or the like). An insert member may then be placed in planar contact with the third adhesion layer. The third adhesion layer may adhere to at least a portion of the insert member. A second planar panel may then be placed in planar contact with the insert member via a fourth adhesion layer so that the second planar panel opposes the first planar panel.

The insert member may be a planar retail item. As an example, the insert member may be pre-paid card such as a gift card, ATM card, phone card or the like. At least one adhesion layer may contact a portion of one side of the insert member. At least one adhesion layer may also contact a film layer. Thus, at least one adhesion layer adheres the insert member to the film layer or to any pattern layer including any coating layer or additional material layer attached thereto. The adhesive bond between an adhesion layer and the insert member may be stronger than the adhesive bond between that same adhesion layer and the pattern layer (or any coating layer or additional material layer attached to the pattern layer), so that when any attempt is made to separate the insert member from the film layer (or any layers attached therebetween) the adhesion layer may pull a portion of the pattern layer toward the insert member. The adhesive bond between an adhesion layer and the insert member may be so great that during separation of the film layer and insert member, a portion of the pattern layer (or any coating layer or additional material layer attached to the pattern layer), may separate from the film layer and be adhered to the insert member. It is this disruption of the film layer that may be indicative of tampering with the packaging.

The film layer may be any material that provides sufficient transparency so that evidence of tampering may be recognized through the film layer. Further, the film layer may also be a material upon which a coating or additional layer (e.g., a pattern layer via and additional adhesion layer) may be placed. The pattern layer must remain in contact with the film layer until any attempted separation of the film layer and insert member. In the event that a pattern layer fails to maintain contact with the film layer, the packaging may appear to show evidence of tampering, even though no tampering has occurred. Thus, the material used for the film layer must display sufficient cohesive strength to maintain contact with a pattern layer, but the cohesive strength must not be so strong that the adhesion layer is prevented from separating the pattern layer from the film layer.

The film layer may be a plastic (e.g., a thermoplastic) film. Common plastic films that may be used include nylon, polyvinyl chloride, polypropylene, high-density polyethylene, low-density polyethylene, linear low-density polyethylene, polyvinylidene chloride and combinations thereof. The film layer may be any material with sufficient transparency for viewing through an opening in a panel of the packaging.

As discussed herein, the film layer may also include a pattern layer that may be removed from the film layer via an adhesion layer during separation of the film layer from the insert member. The cohesive strength between the film layer and the pattern layer must be strong enough to remain in contact with one another until any attempt is made to separate the film layer from the insert member. Upon any attempt at separating the film layer from the insert member, a portion of the pattern layer or any coating or additional material layer thereon, may be removed from the film layer, preferably by an adhesion layer.

The pattern layer may be any material or coating that is sufficiently sturdy so that it can withstand processing and contact with multiple adhesion layers (and any components included therein). The material of the pattern layer may be sufficiently pliable and brittle so that it will tear, flake, or disintegrate as desired during separation of the film layer and insert member. The pattern layer may be a material that breaks into small particles upon separation of the film layer and the insert member making it impossible to reconstruct the pattern layer. The material of the pattern layer may also be sufficiently thin so that entire security packaging maintains a relatively thin profile and does not add significant mass or weight to the packaging or any item contained within the packaging. The material of the pattern layer may be chosen so that it cooperates with multiple forms of adhesion layers, including both adhesive components and cohesive failure components. Thus, the material of the pattern layer may be selected as one that adheres to a desired adhesive, and fails to adhere to a desired slip-coating.

The pattern layer may include a foil material. The foil material can be placed onto the film layer via a cold or hot stamping process. The foil may be a holographic foil so that the foil is difficult to reconstruct after damage by separation of the film layer from the insert member. The pattern layer may include a polymeric material. The pattern layer may be embossed which may advantageously make the pattern layer more difficult to re-construct after separation of the film layer and insert member. The pattern layer may be composed of a film material. Examples of such film materials include polyethylene terephthalate, nylon, polyvinyl chloride, polypropylene, high-density polyethylene, low-density polyethylene, linear low-density polyethylene, polyvinylidene chloride and combinations thereof.

The adhesion layers may include materials that promote adhesion and materials that promote cohesive failure. The adhesion layers may be designed so that during separation of the film layer and the insert member, certain portions of the pattern layer are separated from the film layer while other portions of the pattern layer remain in contact with the film layer. As such, the adhesion layer may include a release coat, slip coat, film, adhesive deadener or the like, so that during separation of the film layer from the insert member, at least a portion of the pattern layer will not adhere to the insert member and will remain in contact with the film member.

Preferred release coatings, slip coatings, films or adhesive deadeners may be any composition easily applied to a small portion of the panel layer, film layer, pattern layer and insert member and having sufficient viscosity so that it does not blend with any adjacent adhesive. Release coating materials may include silicone, polytetrafluoroethylene, compositions of alcohol soluble polyamide resins and zinc stearate, vinyl chloride resins, polyvinyl octadecyl carbamate, polyvinyl stearyl carbamate, fluoro acrylate, fluoro phosphate esters, polyurethane, polyester acrylics, acrylates, and combinations thereof. Adhesive deadeners may include inks, UV coatings, varnishes, films and combinations thereof. Films may include nylon, polyvinyl chloride, polyethylene terephthalate, polypropylene, high-density polyethylene, low-density polyethylene, linear low-density polyethylene, polyvinylidene chloride and combinations thereof.

The adhesion layer may also include one or more adhesives for adhering at least a portion of the panel layer, film layer, pattern layer or insert member to another layer. The adhesive may be capable of adhering to multiple types of substrates, including suitable substrates used for the insert member, the panel layer, film layer and pattern layer. The adhesives may form a strong enough bond to between one or more layers so that the layers are maintained within or attached to the packaging. The adhesives may form a strong enough bond to any pattern layer so that the pattern layer that contacts the adhesive is separated from the film layer during any separation of the film layer and insert member. However, the adhesive bond may not be so strong that it prevents separation of the insert member from the film layer.

Suitable adhesives may include synthetic adhesives such as polymeric (e.g., thermoplastic, elastomeric, emulsion or thermosetting) adhesives. The adhesive may also include a bioadhesive such as starch, casein or albumin based adhesives. The adhesive may also include a UV curing adhesive. The adhesive may be a pressure sensitive adhesive such as a fugitive adhesive.

The panels discussed herein may be any packaging material pliable enough to be scored and folded but strong enough to provide sufficient support for containing an item thereon or within. A particular feature of the material may be that it is durable enough to resist tearing during attempts to remove any packaging contents from within the panels (e.g., to separate the packaging contents from the film layer that is adhered to the panel). The panels may be formed of paper materials including but not limited to paperboard, chipboard, cardboard, fiberboard, natural fibers, mineral fibers or any combination thereof. The panel material may be a virgin material, a post-consumer recycled material, or both. The panel material may be a recyclable material and/or a biodegradable material. If the panel material includes paperboard, the paperboard may be a bleached or unbleached paperboard. For example it may be a solid bleached sulfate (SBS) paperboard. The panel material may contain a major portion that can be recycled. The panels may be formed of a polymeric material including but not limited to thermoplastics, thermoset plastics, elastomeric containing materials or any combination thereof. Examples of polymeric materials that may be employed include polyamide, polyester, polystyrene, polyethylene (including polyethylene terephthlate, high density polyethylene and low density polyethylene), polypropylene, polyvinyl chloride, bio-based plastics/biopolymers (e.g., poly lactic acid), silicone, acrylonitrile butadiene styrene (ABS), or any combination thereof.

The gauge of the panel material may vary depending on the size of the packaging or the desired strength of the packaging. As an example, if the panel material includes paperboard, the gauge of the paperboard may be greater than about 6 point paperboard. The gauge of the paperboard may be less than about 22 point paperboard.

The insert member may be any item requiring packaging in a retail setting. The insert member may include at least one generally planar surface. In the case of the pre-paid card example, the insert member may generally be a polymeric material as is common with pre-paid cards. The insert member may be composed of materials similar to those disclosed for use in the panels such as paperboard materials. The material of the insert member may be able to form a sufficient bond with any adhesive used within the adhesion layers so that the adhesive maintains the bond with the insert member while separating at least a portion of the film member (or any coating or additional material layer contained thereon) from the packaging. Further, the material of the insert member must respond to any release coating or adhesive deadener so that the portions of the film member that should remain in contact with the film member effectively do so.

As shown for example in FIGS. 1 and 2, a panel 12 may include a film layer 20. The film layer 20 may be attached to the panel 12 via a first adhesion layer 42. The first adhesion layer 42 may include adhesive portions 44 and cohesive failure portions which may include an adhesive deadener or film 46. The film layer 20 may be contacted by a second adhesion layer 48 which may also include adhesive portions 44 and cohesive failure portions such as a release coating 50. A pattern layer 32 may then be placed over the second adhesion layer 48. The pattern layer 32 may then be contacted by a third adhesion layer 52. The third adhesion layer 52 may include a release coat portion 50 and an adhesion promoter portion 54. An additional adhesive portion 44 may be included with the third adhesion layer 52 in order to adhere the insert member 16 to the third adhesion layer 52. As shown for example in FIG. 2, when the insert member 16 is separated from the panel 12, the adhesion layers 42, 48, 52 may act to effectively remove a portion 24 of the pattern layer 32 from the panel 12 while leaving an additional portion 56 of the pattern layer 32 attached (via other layers) to the panel 12. This separation may be revealed through a cut out window 18 that the portion 24 of the pattern layer 32 has been removed from the film layer 20. This indicates that removal or tampering with the insert member 16 has occurred.

Figure 4:
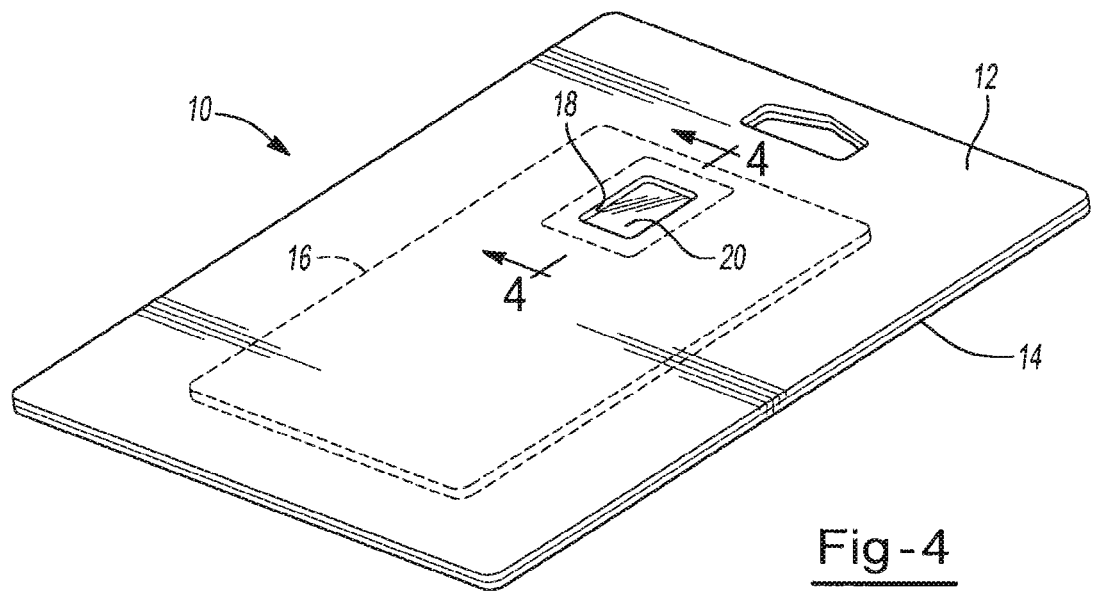
FIG. 4 is a perspective view of the packaging of FIG. 3 in a closed position.
Figure 5:
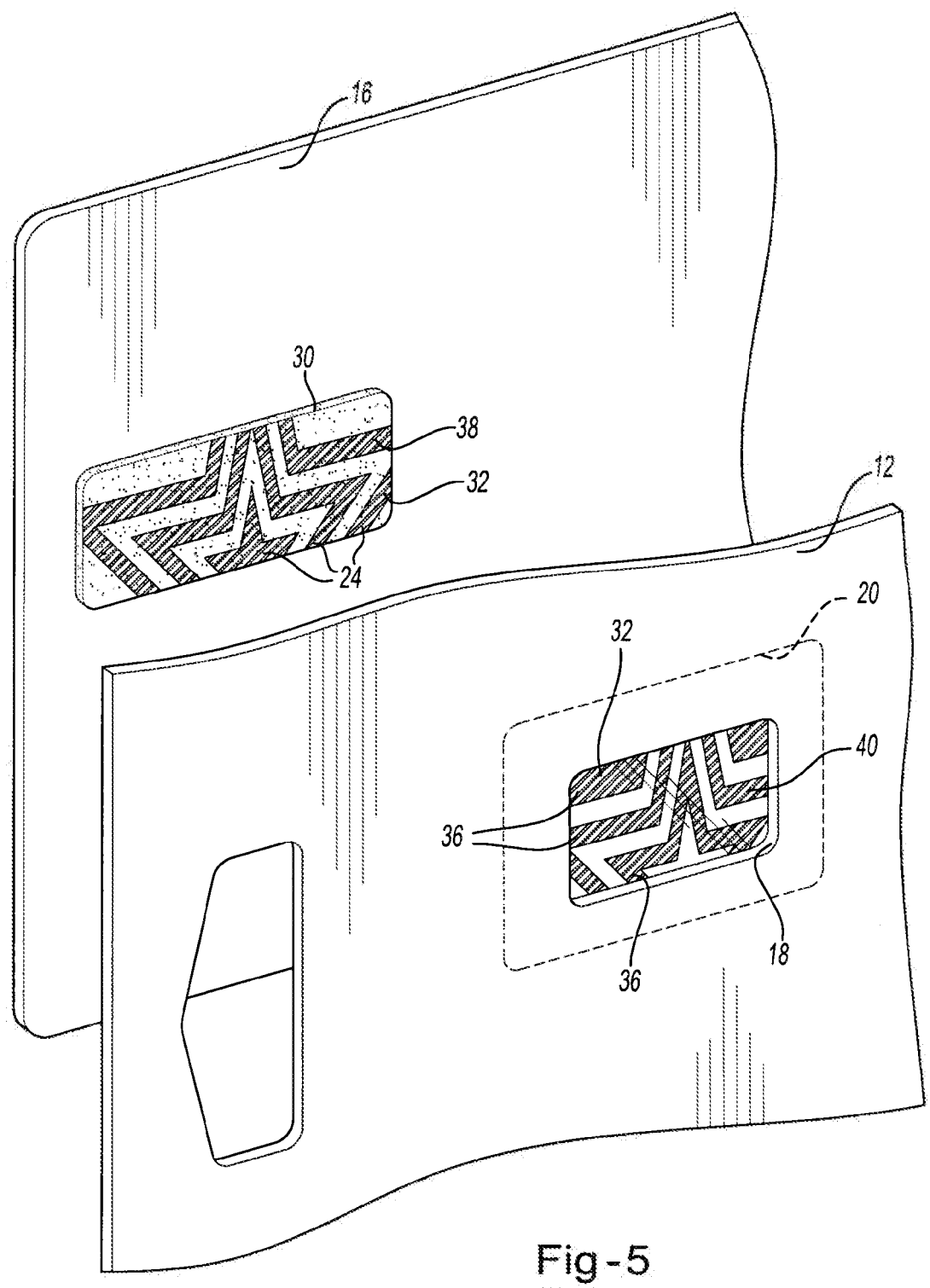
FIG. 5 is a perspective view of the packaging after separation of one or more layers.

As shown for example in FIG. 3, the packaging 10 may include two panels 12, 14 folded and bonded to retain an insert member 16 therein. A cut-out window 18 may be formed in at least one of the panels 12, 14. FIG. 4 shows an example of how one panel 14 may be folded over the other panel 12 with the insert member 16 enclosed therein. The film layer 20 may be cut in the shape of a rectangle overlying the cut-out window 18. As depicted for example in FIG. 5, the pattern layer 32 may include a pattern portion 38 or other indicia. During separation of the insert member 16 from the film layer 20, the pattern portion 38 on the pattern layer 32 may become separated from the pattern layer 32 and adhere (via one or more adhesion layers) to the insert member 16. Thus the film layer 20 may be exposed through the cut-out window 18 at locations 40 where the pattern portion 38 was previously located.

FIG. 6 shows an example of how multiple materials may be layered to create a laminate structure between an insert member 16 and panel 12. The cut-out window 18 may be contacted by an adhesion layer 42, followed by a film layer 20, followed by an adhesion layer 48, followed by a pattern layer 32, followed by an adhesion layer 52.

Though not necessarily drawn to scale, geometries, relative proportions and dimensions shown in the drawings are also part of the teachings herein, even if not explicitly recited. However, unless otherwise stated, nothing shall limit the teachings herein to the geometries, relative proportions and dimensions shown in the drawing.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The invention claimed is:

1. A tamper evident packaging comprising:
a first panel having an opening therein;
a film with first and second surfaces that is at least partially transparent overlaying the opening in the first panel so that the first surface opposes the first panel;
a pattern layer having a top surface and bottom surface placed onto the second surface of the film via a first adhesion layer that contacts the top surface of the pattern layer adjacent the film;
a second adhesion layer placed in contact with the bottom surface of the pattern layer and a surface of an insert member;
wherein at least a portion of the first and second adhesion layers have a peel strength relative to the pattern layer that is higher than the peel strength relative to an adjacent surface so that upon separation of the insert member from the first panel the first and second adhesion layers each remove a portion of the pattern layer from the film or insert member thereby leaving an indicator visible through the opening and film that such separation has occurred.

2. The packaging of claim 1 further including a second panel so that the first and second panels are joined together.

3. The packaging of claim 1, wherein cohesive failure is induced between the pattern layer and the film.

4. The packaging of claim 1, wherein cohesive failure is induced between the pattern layer and the insert member.

5. The packaging of claim 3, wherein the pattern layer includes a continuous configuration that is disrupted when the cohesive failure is induced between the pattern layer and any adjacent layer.

6. The packaging of claim 5, wherein the continuous configuration is substantially prevented from being restored after the cohesive failure is induced between the pattern layer and any adjacent layer.

7. The packaging of claim 1, wherein a portion of the first and second adhesion layers includes a release coating or adhesive deadener to cause the cohesive failure between the pattern layer and any adjacent layer.

8. The packaging of claim 1, wherein the pattern layer includes a foil material.

9. The packaging of claim 1, wherein the pattern layer is formed from a holographic foil.

10. The packaging of claim 1, wherein a third adhesion layer adheres a least a portion of the film to at least a portion of the first panel.

11. The packaging of claim 10, wherein the first, second and third adhesion layers each include an adhesive portion and cohesive failure portion.

12. The packaging of claim 11, wherein the cohesive failure portion includes materials selected from a release coat, an adhesive deadener, a film or any combination thereof.

13. A method for packaging comprising:
providing a first panel having an opening therein;
layering a film with first and second surfaces that is at least partially transparent over the opening in the first panel so that the first surface opposes the first panel;
forming a pattern layer on the second surface of the film, a first adhesion layer being placed between the film and the pattern layer;
placing a second adhesion layer between the pattern layer and an insert member;
wherein at least a portion of the first and second adhesion layers have a peel strength relative to the pattern layer that is higher than the peel strength relative to an adjacent surface so that upon separation of the insert member from the first panel the first and second adhesion layers each remove a portion of the pattern layer from the film or insert member thereby leaving an indicator visible through the opening and film that such separation has occurred.

14. The method claim 13, wherein cohesive failure is induced between the pattern layer and the film.

15. The method of claim 14 wherein cohesive failure is induced between the pattern layer and the insert member.

16. The method of claim 14, wherein the pattern layer includes a continuous configuration that is disrupted when the cohesive failure is induced between the pattern layer and any adjacent layer.

17. The method of claim 16, wherein the continuous configuration is substantially prevented from being restored after the cohesive failure is induced between the pattern layer and any adjacent layer.

18. The method of claim 13, wherein a portion of the pattern layer includes a release coating or adhesive deadener to cause the cohesive failure between the pattern and the film.

19. The method of claim 13, wherein a third adhesion layer adheres a least a portion of the film to at least a portion of the first panel.

20. A tamper evident packaging comprising:
a first panel having an opening therein;
a film with first and second surfaces that is at least partially transparent overlaying the opening in the first panel so that the first surface opposes the first panel;
a pattern layer having a top surface and bottom surface and a continuous configuration thereon, placed onto the second surface of the film via a first adhesion layer that contacts the top surface of the pattern layer adjacent the film;
a second adhesion layer placed in contact with the bottom surface of the pattern layer and a surface of an insert member;
wherein at least a portion of the first and second adhesion layers:
i. have a peel strength relative to the pattern layer that is higher than the peel strength relative to an adjacent surface so that upon separation of the insert member from the first panel the first and second adhesion layers each remove a portion of the pattern layer from the film or insert member thereby leaving an indicator visible through the opening and film that such separation has occurred;
ii. include an adhesive portion and cohesive failure portion, such that the cohesive failure portion includes materials selected from a release coat, an adhesive deadener, a film or any combination thereof.

* * * * *